United States Patent [19]

Truglio

[11] 4,427,634
[45] Jan. 24, 1984

[54] APPARATUS FOR MICROSCOPIC EXAMINATION OF SPECIMENS

[75] Inventor: William J. Truglio, Sayville, N.Y.

[73] Assignee: Wright Laboratories, Inc., Bohemia, N.Y.

[21] Appl. No.: 357,759

[22] Filed: Mar. 12, 1982

[51] Int. Cl.³ .......................... B01L 3/00; C12M 1/28
[52] U.S. Cl. ..................................... 422/99; 356/246; 422/102; 435/294
[58] Field of Search ............... 435/292, 294, 295, 296, 435/297; 422/99, 101, 102; 356/244, 246

[56] References Cited

U.S. PATENT DOCUMENTS

| | | | |
|---|---|---|---|
| 3,464,798 | 9/1969 | Kilthau | 422/102 |
| 3,773,468 | 11/1973 | Hubbard | 422/102 |
| 3,814,522 | 6/1974 | Clark et al. | 422/102 |
| 3,865,551 | 2/1975 | Saiki et al. | 422/102 |
| 4,105,415 | 8/1974 | Lovett | 356/246 |

Primary Examiner—Michael S. Marcus
Attorney, Agent, or Firm—Edward H. Loveman

[57] ABSTRACT

Apparatus for microscopic examination of a specimen includes a cylindrical test tube having a well, defined by closely spaced transparent flat walls at the closed end of the tube. A paddle-shaped insert has transparent insertable flat sided body at one end insertable into the well with a long stem extending out of the open end of the tube. The thickness of the body is slightly less than the spacing of walls of the well to spread specimen therein between and to support the specimen when the apparatus is placed in or on a microscope for examination of the specimen.

5 Claims, 8 Drawing Figures

APPARATUS FOR MICROSCOPIC EXAMINATION OF SPECIMENS

This invention relates to a test tube assembly usable for examination of a specimen, and more particularly concerns such an assembly adapted to serve as a container for the specimen and as a slide for microscopic examination of the specimen.

Test tubes of conventional type heretofore used in laboratory procedures are generally made of transparent glass or plastic material and are cylindrical with spherically curved closed bottom and open top. When used for urinalysis it has been conventional to fill such a test tube 75% full with a urine sample. The test tube is then placed in a centrifuge for a predetermined time so that the sediment therein collects at the bottom of the tube. Almost all the fluid is then spilled out of the tube leaving ¼ to ½ of a milliliter sediment in the tube. The tube is then tapped around its sides to remix the liquid and sediment. A drop of the mixture is then poured out of the tube upon a glass or plastic base slide. Alternatively, a small quantity of the mixture is removed from the tube by a pipette and a drop is placed on the slide. In either case, a cover plate or slide is then placed over the base slide to spread the sediment uniformly. Then the assembly of slides is placed on or in a microscope for examination.

The above conventional procedure has several disadvantages. If the sample contains disease causing bacteria or viruses there is great danger that personnel handling the specimen may come in contact with it. Moreover, the sample can spill onto their hands or their clothes, laboratory furniture and equipment. Even the microscope itself can become contaminated by leakage of the sample between the slides.

The present invention is directed at overcoming the above and other difficulties and disadvantages inherent in examination of a specimen sample obtained by pouring it from a test tube onto a transparent microscope slide, and then spreading it with a cover slide.

According to the invention, there is provided an improved test tube having a transparent cylindrical body, open at one end and closed at its bottom end. The bottom end instead of being hemispherical is formed with two flat parallel sides integrally joined by a cylindrical bottom wall, cylindrically curved end walls, and radially extending shoulders. This structure defines a diametral pocket or well. Also, in accordance with the invention, there is provided a transparent paddle-shaped insert. The paddle has a body formed with flat opposite sides and cylindrically curved end. A long stem is secured to the other end of the body.

In use, the new test tube containing liquid mixed with sediment is centrifuged. Then excess liquid is poured off leaving a small amount of liquid and sediment in the well. Thereafter, the paddle insert is introduced through the tube and the body is snugly seated in the well. The thickness of the body is 1 to 4 mils smaller than the inside spacing of the flat opposed walls of the well. Thus, very thin films of sediment and liquid wet both sides of the body of the insert, i.e. between the insert and adjacent walls of the well. The test tube may then be placed on or in a microscope for examination of the sediment trapped between the walls of the paddle body and side walls of the well of the test tube. It is therefore a principal object of the present invention to provide an assembly of test tube and insert for supporting a specimen to be examined in a microscope.

A further object of the present invention is to provide an assembly as described, including a transparent cylindrical test tube with a well at its closed end defined by spaced, flat parallel walls, to serve as a transparent microscope examination slide.

Another object of the present invention is to provide apparatus including a test tube as described, with a paddle shaped insert having a body to be introduced into the well and serve as a support for specimen to be examined in a microscope.

Another object is to provide apparatus as described with a stem secured to said body to facilitate introduction through said tube into said well.

These and other objects of this invention will be readily perceived from the following detailed description of the invention when read in connection with the appended drawings.

Figure 7:
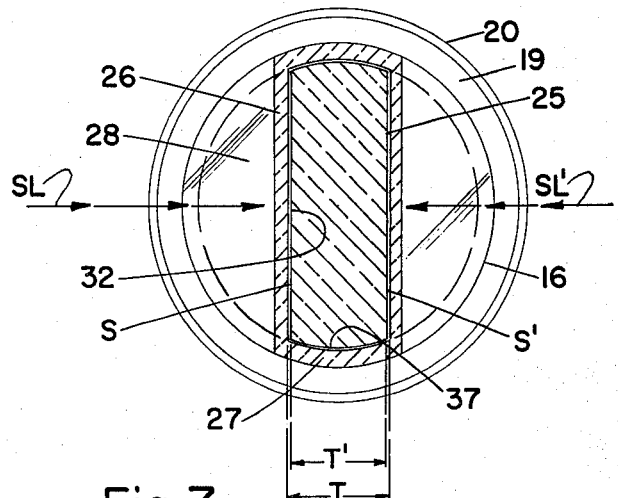
FIG. 7 is a cross-sectional view taken along line 7—7 of FIG. 6.
Figure 8:
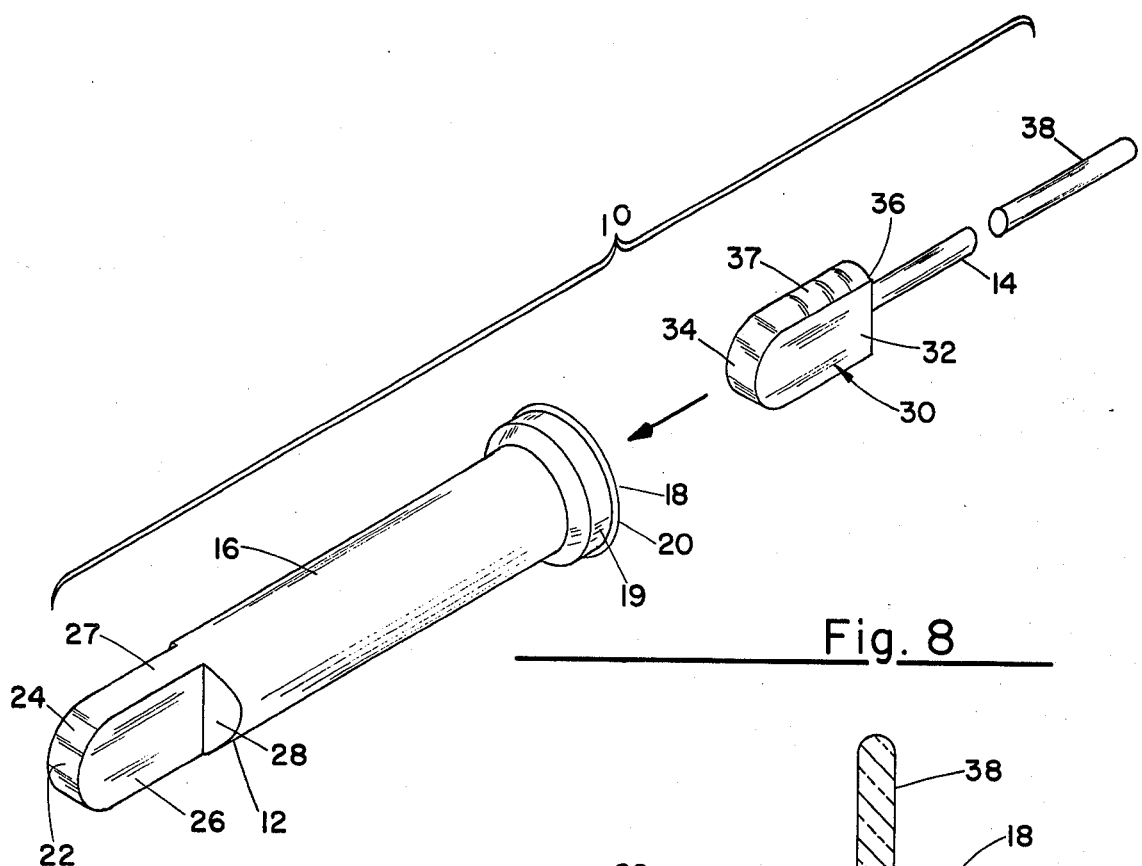
FIG. 8 is an exploded perspective view of the test tube and paddle insert.

Referring now to the drawings wherein like reference characters designate like or corresponding parts throughout, there is illustrated in FIGS. 1-8 an assembly apparatus for microscopic examination of specimen, generally designated by reference numeral 10 including a test tube 12 and a paddle insert 14. The test tube has a cylindrical body 16 with open upper end 18 formed with a reinforcing annular flange 19 and bead 20 as is conventional a bottom end 22 of the test tube 12 is closed and has a cylindrically curved wall 24. A well or pocket 25 in FIG. 7, is defined by two rather closely spaced flat side walls 26 and diametrally spaced cylindrically curved side walls 27 integral extending shoulders 28, and end wall 24. This well may have an external length of about 20 millimeters from end 22 to a shoulder 28 a diametric width equal to that of the tube body 16 of about 15 millimeters and a thickness or narrow width of about 6 millimeters. Allowing for the thickness of the walls 26, the interior narrow width or thickness T of the well 25 indicated in FIG. 7 may be 4 to 5 millimeters. The test tube is made of transparent glass or plastic.

Figures 1, 2, 3, 4:
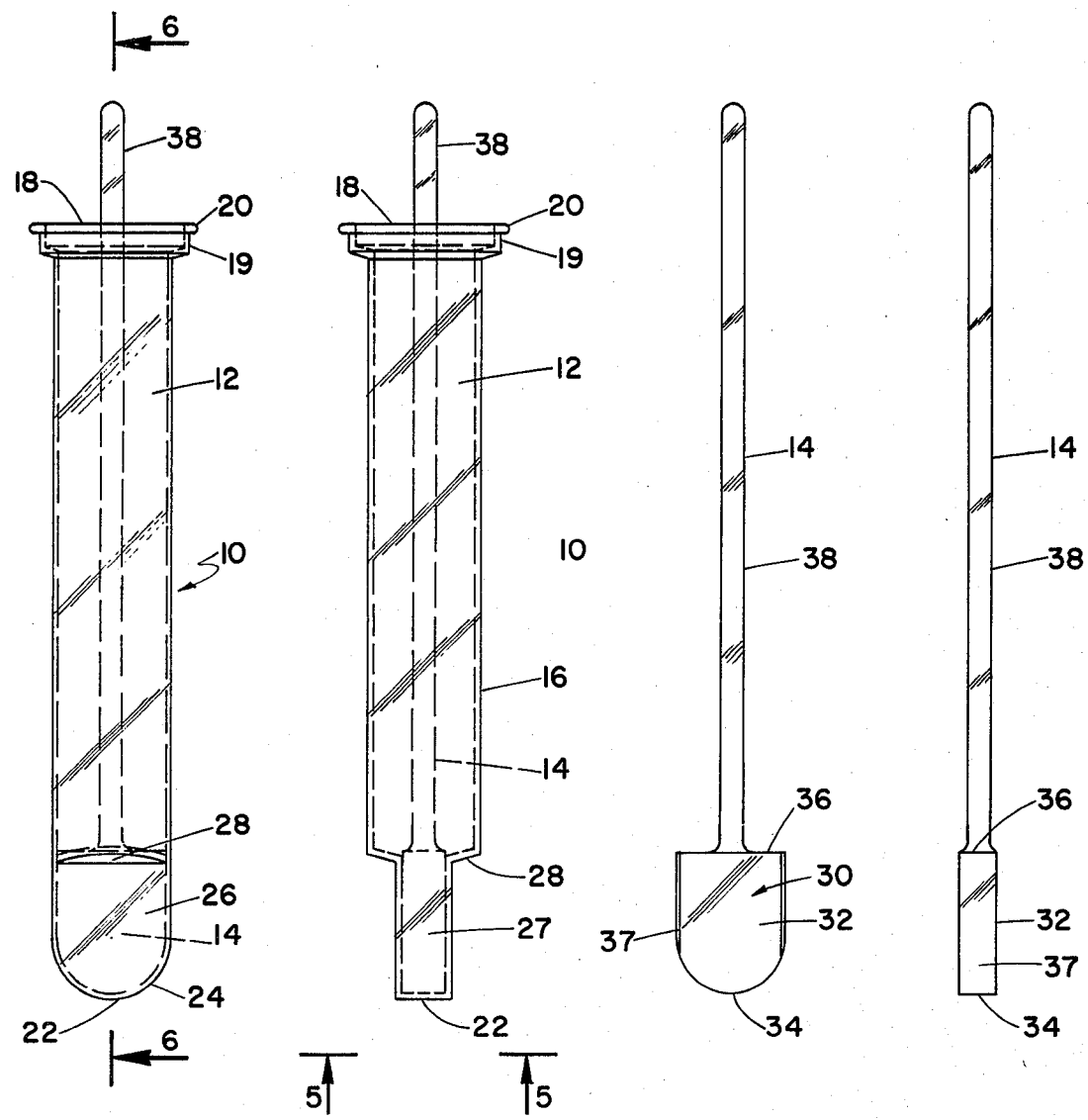
FIG. 1 is a front elevational view of an assembly of test tube and paddle insert embodying the invention.
FIG. 2 is a side elevational view of the assembly of FIG. 1.
FIG. 3 is a front elevational view of the paddle insert per se.
FIG. 4 is a side elevational view of the paddle insert of FIG. 3.
Figure 5:
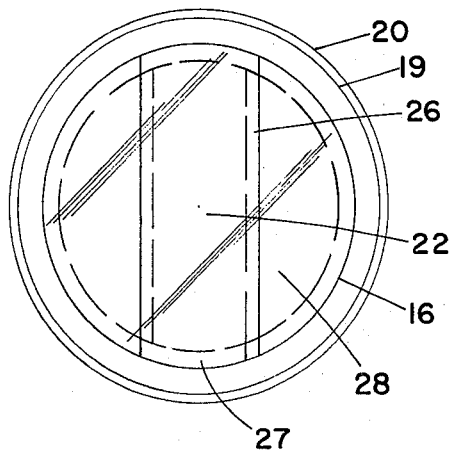
FIG. 5 is an enlarged end plan view taken along line 5—5 of FIG. 2.
Figure 6:
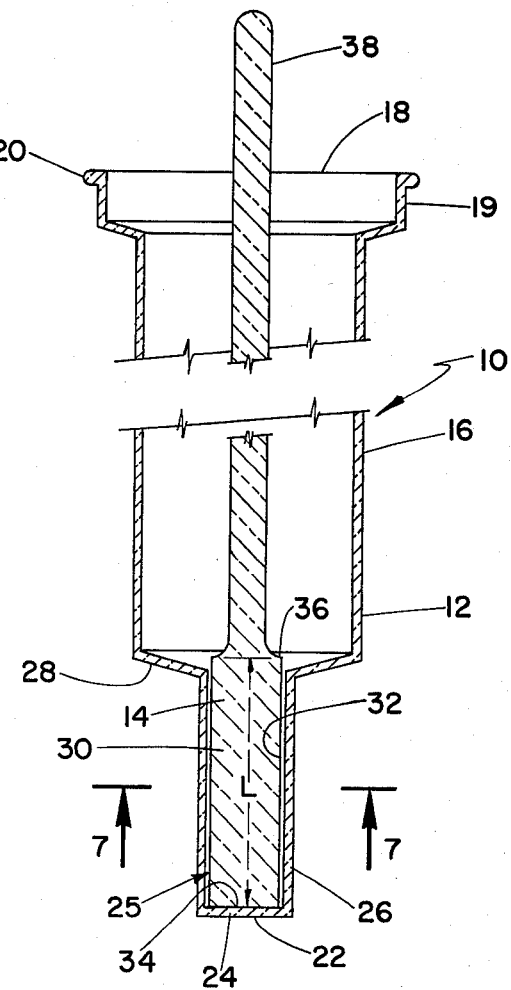
FIG. 6 is an enlarged elevational sectional view taken along line 6—6 of FIG. 1, with portions omitted.

The paddle insert 14 as best shown in FIGS. 3, 4, and 6 has a generally rectangular body 30 at one end, with a pair of flat parallel side walls 32, a cylindrically curved bottom end wall 34 a flat top wall 36 and a pair of cylindrically curved end walls 37. Extending upwardly from the top wall 36 and integral therewith is a stem or rod 38 whose length is longer than that of the cylindrical body 16 of the tube 12 which extends from the shoulders 28 beyond the open end 18. The length L (FIG. 6) of the paddle body 30 is sustantially equal to the internal length of the well 25, i.e. between the end wall 24 and the shoulders 28 of the tube 12. The end walls 37 of the paddle body are preferably cylindrically curved to conform with the inner sides of the diametrally opposed end walls 27 of the well 25. The thickness T' of the paddle body 30 is slightly less than the internal thickness T of the well 24, see FIG. 7. The total difference may range from 1 to 4 mils. Thus, when the paddle insert 14 is fully inserted into the well 25, spaces S, S' will exist between the inner sides of the walls 26 of the tube 12 and the side walls 32 of the paddle insert 14. The stem 38 will extend outwardly of the open end of the tube 12 as clearly shown in FIGS. 1, 2, and 6. The paddle insert 14 is made of transparent glass or plastic.

In use the test tube 12 will be approximately 75% filled with a fluid such as urine sample. The tube 12 will be centrifuged to settle the sediment at the bottom end 22 of the tube 12 in the well 25. Then the tube 12 will be tilted to pour off almost all the clear liquid, leaving the sediment and some liquid in the well 25. The tube 12 can be shaken to distribute the sediment in the liquid. Then the paddle insert 14 will be introduced into the tube 12, and the body 30 will be inserted snugly into the well 25 with the end walls 34 and 24 in abutment, and the walls 37 contacting the walls 27. This will cause the mixture of liquid and sediment to spread and coat the side walls 32 of the paddle body 30. The assembly may now be placed in horizontal position on or in a microscope so that the sediment may be microscopically examined from either direction in line of sight SL or SL; see FIG. 7. The walls 26 and 32 serve as transparent slides.

It will be noted that after the clear liquid is poured off and the paddle body 30 is introduced into the well 25, the sediment specimen is not exposed to the air. At all times the sediment remains inside the test tube and cannot escape during microscopic examination to contaminate adjacent equipment; nor can the sediment be contacted by an operator of the equipment. The use of prior fragile, slippery glass slides is entirely eliminated. The assembly of tube and paddle insert may be manufactured by mass production machinery at such low cost that it may be discarded after use. The assembly of tube and paddle insert may be supplied in a sterilized package to be opened at the time of use.

It should be understood that the foregoing relates to only a limited number of preferred embodiments of the invention which have been by way of example only and that it is intended to cover all changes and modifications of the examples of the invention, herein chosen for the purpose of the disclosure, which do not constitute departures from the spirit and scope of the invention.

What is claimed is:

1. Apparatus for microscopically examining a specimen comprising:
   a transparent cylindrical tube having open and closed opposite axial ends;
   said closed end of said tube being formed with closely spaced, flat walls and diametrically spaced circumferentially extending narrow other walls defining a diametrically extending centrally located well for containing said specimen while being examined in a microscope;
   wherein said well is substantially rectangular in cross-section and has a first dimension substantially equal to the diameter of said tube and a second dimension less than one half the diameter of said tube;
   an insert for said well, said insert having an optically transparent flat body with flat, opposed sides, said body being slightly smaller in cross-sectional area than the cross-sectional area of the interior of said well to facilitate insertion into said well and to serve as a slide support for said specimen in said well during examination thereof in said microscope; and
   said insert having a stem longer than the axial length of said tube and secured to one end of said body to facilitate insertion of said body through said tube into said well and removal therefrom.

2. Apparatus as defined in claim 1, wherein said body has a width substantially equal to said first dimension to fit snugly in said well and wherein said body has a thickness smaller than said second dimension to define a space ranging from 1 to 4 mils between said sides of said body and adjacent sides of said flat walls of said well to spread said specimen and to support said specimen for examination in said microscope.

3. Apparatus as defined in claim 2, wherein said closed end of said well is substantially cylindrically curved, and wherein the other end of said body has a curvature corresponding to that of said closed end of said well to prevent rotation of body in said well to maintain said spaces between said sides of said body and said adjacent sides of said walls of said well.

4. Apparatus as defined in claim 2, wherein said tube is formed with shoulders at the open end of said well integral with said flat walls thereof, to dispose said well diametrally of said tube at its closed end.

5. Apparatus as defined in claim 4, wherein said well has a length axially of said tube substantially equal to the distance between said closed end of said tube and said shoulders, and wherein said body of said insert has a length axially of said tube substantially equal to said length of said well to fit snugly therein.

* * * * *